United States Patent
Cincotta et al.

(10) Patent No.: US 12,510,242 B2
(45) Date of Patent: Dec. 30, 2025

(54) MULTIMODE DIRECT INJECTION HEATER ASSEMBLY

(71) Applicant: ProSonix, LLC, West Allis, WI (US)

(72) Inventors: Bruce Allen Cincotta, Brookfield, WI (US); Nikolai Crumbaugh, Milwaukee, WI (US)

(73) Assignee: Prosonix, LLC, West Allis, WI (US)

( * ) Notice: Subject to any disclaimer, the term of this patent is extended or adjusted under 35 U.S.C. 154(b) by 154 days.

(21) Appl. No.: 17/495,521

(22) Filed: Oct. 6, 2021

(65) Prior Publication Data

US 2022/0113021 A1  Apr. 14, 2022

Related U.S. Application Data

(60) Provisional application No. 63/089,128, filed on Oct. 8, 2020.

(51) Int. Cl.
*F22B 37/72* (2006.01)
*F22B 29/06* (2006.01)
*F22B 37/74* (2006.01)

(52) U.S. Cl.
CPC .............. *F22B 37/72* (2013.01); *F22B 29/06* (2013.01); *F22B 37/74* (2013.01)

(58) Field of Classification Search
CPC .......... F22B 37/72; F22B 29/06; F22B 37/74; B01F 25/105; B01F 25/313; F16L 55/045
See application file for complete search history.

(56) References Cited

U.S. PATENT DOCUMENTS

| | | | |
|---|---|---|---|
| 2,455,498 A | 12/1948 | Kern | |
| 3,918,851 A * | 11/1975 | Fitzgerald | F02B 75/04 417/364 |
| 3,984,504 A * | 10/1976 | Pick | F16L 55/045 239/432 |
| 5,622,655 A | 4/1997 | Cincotta et al. | |
| 5,842,497 A | 12/1998 | Drifka et al. | |
| 6,082,712 A | 7/2000 | Cincotta et al. | |
| 6,361,025 B1 | 3/2002 | Cincotta et al. | |
| 7,152,851 B2 | 12/2006 | Cincotta | |
| 2006/0175721 A1* | 8/2006 | Cincotta | B01F 35/833 261/124 |
| 2019/0285220 A1* | 9/2019 | Eros | E03B 7/075 |
| 2020/0215498 A1* | 7/2020 | Giardino | B67D 1/0058 |

* cited by examiner

*Primary Examiner* — Edelmira Bosques
*Assistant Examiner* — Brett Peterson Mallon
(74) *Attorney, Agent, or Firm* — Boyle Fredrickson, S.C.; Kirk L. Deheck (57) ABSTRACT

A steam direct injection injector and direct injection heater assembly. The injector defines an enclosure having an upstream end that is constructed to receive a steam fluid flow and a plurality of radially oriented orifices that are configured to distribute and inject the steam into a surrounding fluid. A seat is disposed proximate a downstream end of the injector and a movable plug or modulating component is disposed within the enclosure proximate the seat. A biasing element is disposed between the seat and the modulating component and configured to interact with the seat and the modulating component to allow selective exposure of a second heating section without obstructing a first heating section that are defined by the radially oriented orifices of the injector.

16 Claims, 4 Drawing Sheets

MULTIMODE DIRECT INJECTION HEATER ASSEMBLY

CROSS REFERENCE TO RELATED PATENTS

This non-provisional patent application claims priority to U.S. Provisional Patent Application Ser. No. 63/089,128 filed on Oct. 8, 2020 titled "Multimode Direct Injection Heater Assembly" and the disclosure of which is incorporated herein.

BACKGROUND OF THE INVENTION

Direct steam injection is a common way of heating fluids in many sanitary and industrial processes. Unlike conventional indirect heat exchangers, which include a barrier between a fluid flow stream and a steam or other heating fluid flow stream, direct contact injection heaters mix steam or other heating fluids directly with the working fluid flow to raise its temperature. Direct steam heaters commonly rely on two primary factors to achieve stable condensation of the steam into the fluid being heated. These factors include a temperature differential between the steam flow and the fluid being heated fluid flow and the velocity of the steam as it is injected into the fluid being heated fluid flow. Of the two factors, steam velocity is more important to achieving a desired change in the temperature of the fluid flow and to maintaining the desired operation of the heater assembly.

The direct steam injection heating market is typically served by two types of devices: 1) steam spargers; and 2) internally modulated steam control heaters. A sparger is a common, inexpensive type of steam injector which uses an external steam valve to control the mass flow of steam injected into the fluid. The steam control valve lowers the steam pressure in the sparger to reduce the amount of steam flow. Typically, in a sparger, the steam pressure must be lowered significantly to affect the desired steam flow into the process. In doing so, the lowering of the pressure also greatly lowers the velocity associated with the steam flow at the point of injection thereby making noise, vibration, or hammer in the heater assembly likely. To avoid such conditions, spargers are typically provided with a very limited turndown or range of adjustment between the minimum and maximum values of the stream flow. Maximum steam flow turndown relative to the working fluid flow is typically provided at a ratio of 1.5:1 in real world performance applications. Attempting to further reduce steam pressure and/or steam flow beyond such conditions can result in poor thermal exchange or dangerous operating conditions.

Another problem inherent with sparger-type steam injection devices is the tendency of the steam holes, ports, or orifices of the injector to foul or plug. Such concerns can be exacerbated during hard water or non-water sparger-type heater applications. The holes associated with distributing the heated flow or steam or non-water heating fluid are commonly susceptible to fouling or the inability to stay clean due to a lack of sufficient pressure differential between the steam or heated fluid flow and the liquid, slurry, or other fluids that are being heated. The lack of a suitable pressure differential limits the velocity of the steam and thereby the ability of the steam or heated fluid to clean the holes defined by the injector during operation of the heater.

An internally modulated steam injector assembly utilizes a choked or restricted flow of the steam flow at all times in the heating process. The steam flow is varied by changing the area that is available for injection of steam flow into the fluid flow stream. The pressure associated with the steam flow is generally constant throughout the range of operation of heater assembly. As such, such methodologies provide relatively high velocity steam at the point of injection throughout the entire heating range. This allows the maximum variability on steam flow with stable operation. Steam flow can be varied from 0 to 100% with complete stability throughout the range. Unfortunately, existing externally modulated direct injection heaters are limited by the range of the steam turndown (maximum/minimum fluid flow rates) they can tolerate while maintaining a safe operating condition of the heater assembly with negligible noise or hammer attributable to steam bubble cavitation and/or degradation of operation of the injector due to particulate collection associated therewith.

As such, there is a need for an alternative approach to direct injection heating that provides the benefits attenuate to traditional sparger-type heater assemblies and internal modulated approaches and does so without the associated drawbacks.

SUMMARY OF THE INVENTION

The present invention is related to a direct injection steam heater assembly, and more particularly, to a multi-mode, semi-modulated direct steam heater assembly. One aspect of the present application discloses a steam heater assembly that includes a working fluid chamber and a heating fluid injector disposed within the chamber. The fluid chamber includes one or more fluid ports to communicate the working fluid through the fluid chamber and over the injector. The injector extends into the fluid chamber and defines an enclosure extending from an upstream end to a downstream end. The injector includes a number of holes, orifices, or ports that are each configured to allow fluid communication through the injector. The ports are segregated to define a first group or set of ports associated with a first heating section of the injector and a second set or group of ports associated with a second heating section of the injector. The upstream end of the injector includes a port configured to communicate steam or a heating fluid into the volume defined by the injector. A cap, stop, or a seat that is disposed proximate a downstream end of the injector and a moveable plug, modulating component, or modulator that is slideably disposed within the volume of the injector. The modulator is moveable relative to the seat to allow selective sequential obstruction of various ones of the second set the ports defined by the injector. A biasing element is disposed between the seat and the modulating component and is configured to interact with the seat and the modulating component to allow selective exposure of a second heating section defined by the injector without obstruction of the ports associated with the first heating section.

Another aspect of the application discloses a direct injection steam heater assembly that includes a working fluid chamber that includes one or more fluid ports associated with communicating a working fluid through the heater assembly. An injector extends into the fluid chamber and defines an enclosure that extends from an upstream end toward a downstream end of the injector. The upstream end has a port that is configured to receive a heating fluid communicated into the injector. A seat is disposed at the second end of the enclosure and a modulating component is disposed within the enclosure and slideable relative thereto. A biasing element is disposed between the seat and the modulating component and configured to bias the modulating component away from the seat. The injector includes a first plurality of openings formed through the injector and that define a first heating section and a second plurality of openings formed through the injector that define a second heating section. The modulating component is configured to block the second plurality of openings when a pressure associated with the heating fluid flow in the injector is lower than a pressure of the working fluid flow and to expose the second plurality of openings when a pressure of the heating fluid flow in the injector is higher than the fluid flow pressure and a demand for heat exists.

A further aspect of the present application discloses a method of manipulating thermal exchange of a direct injection heating device. The method includes providing a fluid chamber and disposing a perforated injector within the fluid chamber. A slideable modulator body is disposed within the perforated injector such that a first set of openings defined by the perforated injector allow fluid communication between a volume of the perforated injector and a volume between the fluid chamber and the perforated injector when a working fluid flow pressure is no greater than a pressure of the heating fluid flow associated with the perforated injector and such that a second set of openings which includes the first set of openings allow fluid communication between the volume of the perforated injector and the volume between the fluid chamber and the perforated injector when the pressure of the heating fluid flow is greater than the pressure of the working fluid flow.

A further aspect of the invention discloses a direct injection steam heater injector assembly that includes an injector body that is defined by a cylinder having a longitudinal length and a plurality of holes formed through the injector body along the longitudinal length of the injector body. A steam inlet is defined by the injector body and constructed to connect the injector body to a steam source. A modulator body is disposed in the injector body and configured to be slideable relative thereto along a portion of the longitudinal length of the injector body. A stop or seat is defined by or secured to the injector body at a location that is offset longitudinally from the intake opening. A biasing device is disposed between the seat and the modulator body and is operable to resist translation of the modulator body relative to the injector body.

These and other aspects, features, advantages, and objectives of the present invention will be understood from the drawings and the following detailed description directed to the preferred embodiment of the present invention.

DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The present invention and the various features, aspects, and advantageous details thereof are explained more fully with reference to the non-limiting embodiment described in detail in the following description.

Figure 1:
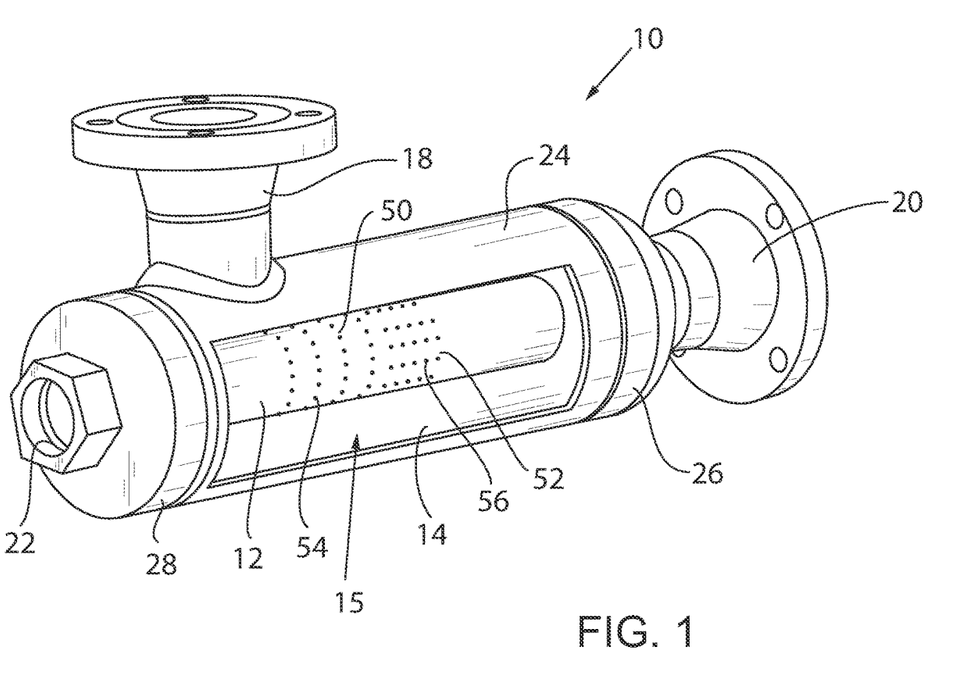
FIG. 1 is a perspective view of a steam heater assembly according to the invention.
Figure 2:
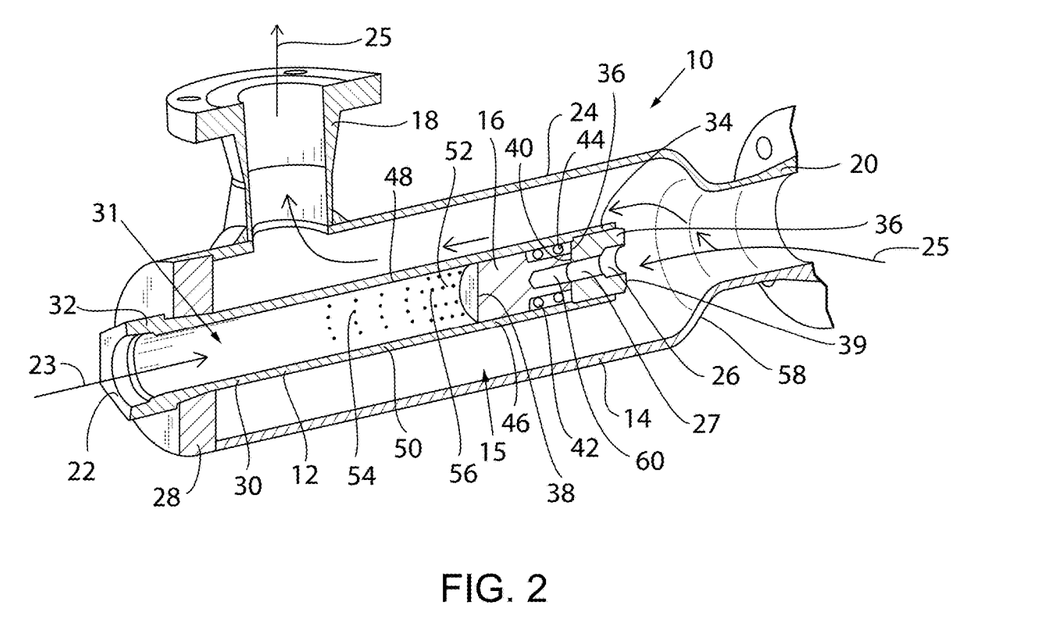
FIG. 2 is a cross-sectional view of the steam heater of FIG. 1.

Referring first to FIGS. 1 and 2, a steam heater assembly or steam heater 10 is shown according to a representative embodiment of the invention. The steam heater 10 includes an injector assembly, injector body or an injector 12 that is disposed within a fluid chamber 14, and more specifically, a cavity 15 of the fluid chamber 14. The injector 12 includes a modulating component 16 that enhances the usability of the steam heater 10 by increasing the available operating range of the steam heater assembly or direct injection steam heater device 10. The fluid chamber 14 includes a first port 18 and a second port 20 that are constructed to accommodate the passage of a working fluid or a fluid whose temperature is intended to be manipulated via passage through the steam heater and the mixing of the heated fluid flow introduced thereto via the injector. In one embodiment, the injector 12 includes a port 22 that extends through the fluid chamber and is constructed to communicate a flow of steam or other suitable heating fluid into the injector 12. It should be appreciated that steam heater 10 is useable for manipulating the temperature of working fluids and slurries for both sanitary as well as industrial applications. Although referred to as a steam heater, it is further appreciated that other fluids or gases, heated or otherwise, can be communicated to injector 12 via port 22 and mixed with a working fluid or a fluid that is communicated through fluid chamber 14 and around injector 12 via ports 18, 20 and whose temperature is intended to be manipulated via mixing with the gas or fluid mixed therewith via injector 12.

In the representative embodiment of the invention, the fluid chamber 14 is cylindrical in shape with the first port 18 extending upward from an outer surface 24 of the fluid chamber 14 and the second port 20 extending from a first distal end 26 of the fluid chamber 14, while the injector 12 is inserted into the cavity 15 of the fluid chamber 14 at a second distal end 28 of the fluid chamber 14. In varying embodiments of the invention, the first and second ports 18, 20 may be disposed at any location of the fluid chamber 14, and the injector 12 may be inserted into the cavity 15 of the fluid chamber 14 from any side of the fluid chamber 14 and/or associated with a tank containing the working fluid. Additionally, the fluid chamber 14 may be made in any shape. Preferably, the physical association of injector 12 relative to chamber 14 of heater 10 are constructed and oriented to allow radial or mostly radial dispersion of the heating fluid associated with injector 12 into the working fluid passing through chamber or cavity 15 of heater 10 and/or a volume of fluid disposed within a tank.

As further shown in FIGS. 1 and 2, the port 22 of the injector 12 is external the fluid chamber 14 and allows coupling of the injector 12 to a steam or other heating fluid source to communicate fluid associated with the steam or other heating source along a first fluid path 23 internal to injector 12. Although referred to as a fluid flow, it is appreciated that the steam flow can be provided in a gaseous state. As will be described in further detail below, the injector 12 is configured to allow injection of steam associated with first fluid path 23 into the fluid chamber 14. As a result, the fluid passing along first fluid path 23 passes through available ports defined by injector 12 and is introduced to a second fluid path 25 through the fluid chamber 14 via the ports 18, 20 and which is heated by the steam or other desired fluid, whether in a fluid or gaseous state, injected into the fluid passing through the second fluid path 25 associated with fluid chamber 14 via injector 12.

The injector 12 includes an enclosure 30 defined by a generally elongate body and having a first/upstream end 32 and a second/downstream end 34 and surrounding a cavity 31. In the representative embodiment of the invention, a stop, cap, or seat 36 is statically disposed within the cavity 31 of the enclosure at the second end 34 of the enclosure 30 defined by injector 12. Alternatively, it is appreciated that the seat 36 can be defined by the structure of a sidewall or body of injector 12. As shown, a first/upstream end 37 of the seat 36 extends into the cavity 31 of the injector 12, while a second/downstream end 39 of the seat 36 is exposed to the fluid chamber 14 defined by heater 10. A plug, modulator, or modulating component 16 is slideably disposed within the cavity 31 of the enclosure 30 of injector 12 and includes a first/upstream end 38 and a second/downstream end 40. As disclosed further below, modulating component 16 is moveable relative to injector 12 so as to manipulate the available area associated with fluid communication between cavity 31 of injector 12 and the area therearound. One or more optional sealing elements may be provided between the radial interface associated with the outer surface of the modulating component 16 and the radially inward facing surface of injector 12 to mitigate any fluid exchange, or blowby, therebetween. As disclosed further below, the modulating component 16 is slideably disposed within enclosure 30. When operating at full heating capacity, modulating component 16 can achieve an orientation wherein the modulating component 16 can achieve a position adjacent or nearly adjacent the seat 36. During operation of heater 10 when less demand for heating is required, modulating component 16 translates relative to seat 36 in a direction toward port 22 of injector 12. Said in another way, when less heating demand is required, modulating component 16 is generally disposed further from seat 36 than when greater heating demand is required. As disclosed further below, the relative longitudinal position of modulating component 16 relative to seat 36 manipulates the cross sectional area available for fluid exchange between the interior surface and the exterior surface of injector 12.

A biasing element 42, such as compression spring or the like, is disposed in cavity 31 of injector 12 between seat 36 and modulating element 16. Biasing element 42 interacts with the seat 36 and the modulating component 16 to bias the second end 40 of the modulating component 16 away from the first end of the seat 36. In the representative embodiment of the invention, the modulating component 16 includes a notch 44 formed in the outer surface 46 thereof around the circumference of the modulating component 16 adjacent its second end 40. In turn, the biasing element 42 (for instance, a spring) is disposed within the notch 44 of the modulating component 16 so as to be located between the modulating component 16 and an inner surface 48 of the enclosure 30, while acting on the seat 36 and the modulating component 16.

The injector 12 includes a first heat section 50 and a second heat section 52. In the first heat section 50, the enclosure 30 of injector 12 includes a number of openings 54 formed through the enclosure 30 for injecting the steam or other heating fluid flow into the fluid chamber 14 defined by heater 10. Openings 54 are preferably oriented to be disposed in a circumferentially and axially spaced orientation along first heating section 50. The openings 54 of the first heat section 50 are always open so as to allow fluid flow from the cavity 31 of the injector 12 to the cavity 15 of the fluid chamber 14. As a result, the first heat section 50 injects steam or other suitable heating fluid flow into the working fluid flow associated with fluid chamber 14 when steam is being provided to the injector 12 via port 22 at the first distal end 32 of the enclosure 30 during heating operations.

The second heat section 52 is adjacent the first heat section 50 on the downstream side of the first heat section 50. In other words, the second heat section 52 is closer to the second end 34 of the injector 12 than the first heat section 50. The second heat section 52 adds additional capacity for steam injection at higher steam (or injected fluid) pressures and also includes openings 56 formed in enclosure 30 to allow selective additional fluid communication therebetween.

In the representative embodiment of the invention, the second heat section 52 includes a larger number of ports, orifices, or openings 56 that are spaced closer together, while the first heat section 50 includes a comparatively smaller number of ports, orifices, or openings 54 that are spaced further apart. Varying embodiments of the invention, such as the graphic representation shown in FIG. 5 by way of one example, may include the same or different number of openings 54, 56 in the first and second heat sections 50, 52. For instance, the size and locations of the discrete openings 54, 56 could be provided in various configurations of size, number, and location to provide the desired fluid exchange or communication of heating fluid through the body of injector as a function of the relative position of modulating component 16 relative to injector 12.

At lower steam pressures, the modulating component 16 is biased by spring 42 and the working fluid flow pressure to cover or otherwise obstruct the openings 56 of the second heat section 52. Said in another way, at lower steam pressures, openings 56 associated with second heat section 52 are rendered unavailable for the communication of heating fluid through the wall of injector. As a result, lower steam pressures result in exposure of the openings 54 in the first heat section 50, while the openings 56 of the second heat section 52 are closed off, blocked, inaccessible, or otherwise obstructed by the modulating component 16 and/or the relative longitudinal position of modulating component 16 relative to injector 12. In the first heat section 50, approximately a 1.5:1 steam turndown or adjustment between the maximum heating fluid flow and minimum heating fluid flow is available.

As the steam pressure within the cavity 31 of the injector 12 increases, the pressure acts on the first end 38 of the modulating component 16 to initially overcome the bias of the working fluid flow pressure and sequentially the biasing force of spring 42 and biases the modulating component 16 toward the second end 34 of the enclosure 30 to thereby reveal the openings 56 of the second heat section 52. In turn, the openings 56 of the second heat sections 52 are exposed at higher steam pressures or otherwise rendered available for communicating the heating fluid flow through injector 12. The steam flow through the available unobstructed openings 54, 56 associated with the combined first heat section 50 and available openings of the second heat section 52 will rise at a somewhat greater than linear rate until all the available openings 56 of the second heat section 52 are exposed and thereby allowing greater heating capacity than can be achieved with fluid connectivity of the holes associated with only first heat section 50.

As shown in FIG. 2, the second end 40 of the modulating component 16 at the downstream side of the modulating component 16 may be exposed to the fluid within the fluid chamber 14. For instance, the seat 36 may include a cavity or passage 27 formed along its length to allow fluid to flow toward the second end 40 of the modulating component 16. In turn, the pressure exerted on the second end 40 of the modulating component 16 is respective of the pressure associated with the working fluid flow pressure associated with second fluid path 25. Further yet, the second end 34 of the injector 12 is spaced apart from an inner surface 58 of the fluid chamber 14 in order to allow the fluid to interact freely with the modulating component 16 and reflect the fluid pressure within the fluid chamber 14. In the representative embodiment of the invention, the second end 36 of the modulating component 16 may further include a recess 60 formed therein. The recess 60 enhances the interaction between the fluid pressure within the fluid chamber 14 and the second end 36 of the modulating component 16.

Figure 3:
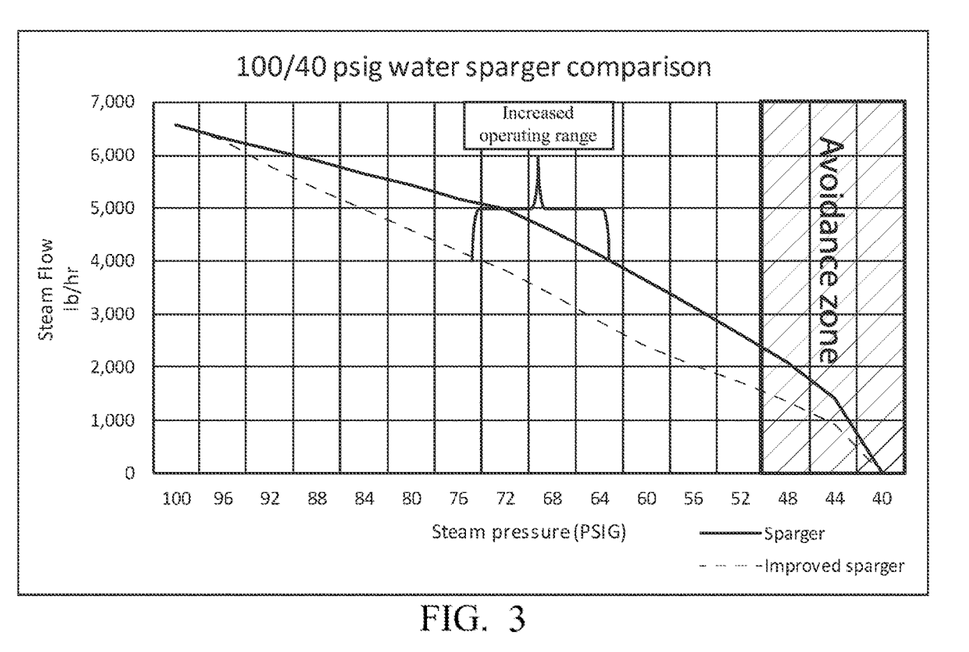
FIG. 3 is a graphical depiction showing a comparison of operation of the direct injection heater assembly of FIG. 1 with respect to other known direct injection heater assemblies.
Figure 4:
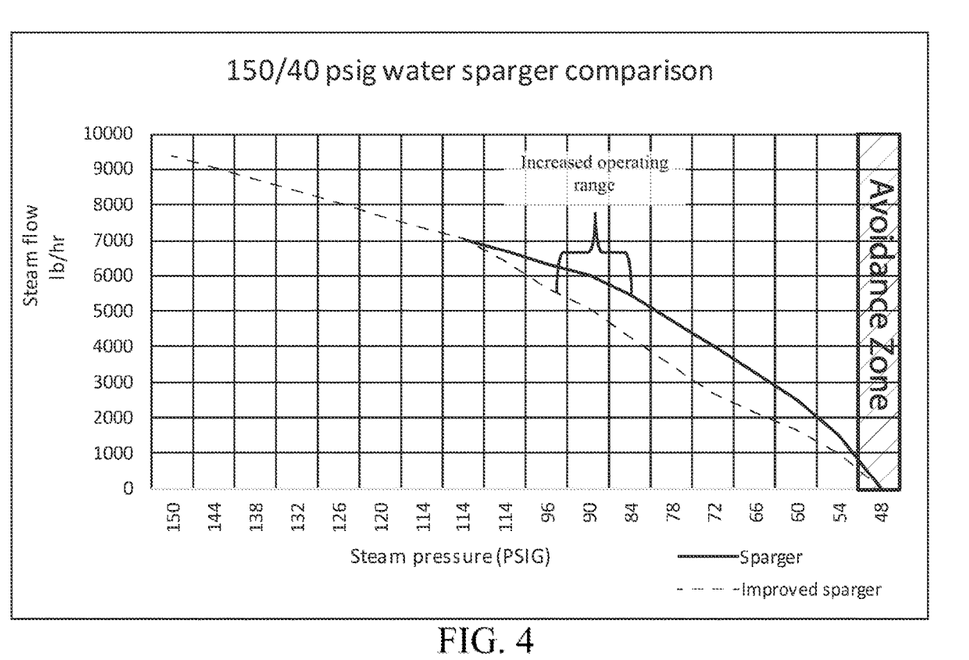
FIG. 4 is a graphical depiction showing a comparison of another direct injection heater assembly according to FIG. 1 with respect to other known direct injection heater assemblies.

A heating device 10 including an injector 12 such as that described above is able to operate at higher pressures than traditional sparger-type heater assemblies. As a result, the injector 12 is able to inject steam at a higher velocity, which operates in a quieter and more stable manner. Further still, the higher differential between the steam or heating fluid flow and the working or heated fluid flow allows for a greater "safety margin" during operation of the heating device 10. In addition, the operation of the injector 12 at higher pressures and velocities reduces the likelihood of the openings 54, 56 being fouled or otherwise becoming obstructed during operation due to hard water conditions and/or particulates associated with non-steam or water heating fluid flows as compared to traditional spargers. FIGS. 3 and 4 are respective graphs depicting the improved capabilities of the injector 12 of the present invention as compared to operation of traditional spargers.

Figure 5:
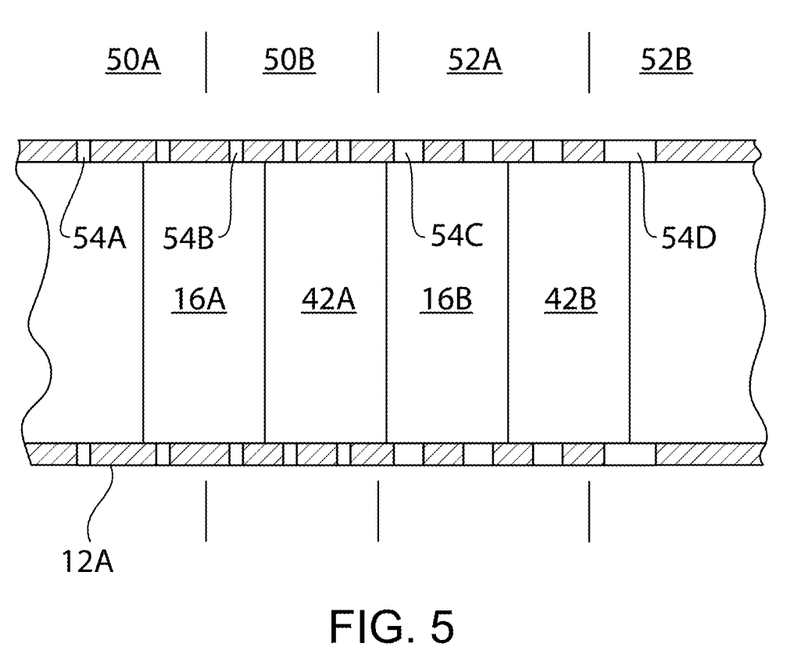
FIG. 5 is a graphical representation of a direct injection heater assembly according to another embodiment of the invention.

While the representative embodiment of the invention disclosed above illustrates the use of two heat sections 50, 52 to create a two-stage injection heater assembly, as shown graphically in FIG. 5, it is appreciated that varying embodiments of the invention may use any number of heat sections 50A, 50B, 52A, 52B, alterative numbers of biasing devices 42A, 42B, and/or biasing devices having various stages associated with resistance to translation of the modulating element to create a variety of multi-stage heater device assemblies or models. Further still, it is also appreciated that multi-stage models may include other numbers of modulating components 16A, 16B, biasing elements 42A, 42B, diameters, and seats 36 to effectuate the desired selective coverage or obstruction and exposure of the respective heating sections. It is further appreciated that modulating component 16A, 16B may be provided as a plurality of sequentially operable modulating components wherein translation of the discrete modulating components relative to the surrounding injector 12A, and the discrete through holes 54A, 54B, 54C, 54D defined thereby, be independently controlled as part of a sequential chain of discrete biasing devices 42A, 42B.

It is appreciated that numerous methodologies may be employed to manipulate the operating performance of heater assembly 10. For instance, it is appreciated that the biasing device associated with translation of the modulator can be provided with numerous springs rates used to change the response curve of the steam pressure. For instance, a stiffer spring could allow for better control with high pressure heating fluid flows, or a low force spring could allow for use in low pressure heating fluid flow applications. In addition to manipulation of the spring performance as disclosed above, it is further appreciated that heater device 10 be provided with multiple stages of modulator/spring assemblies, either being individually operable or operable in a chain methodology, to allow for greater expanded heating fluid flow pressure operating ranges and/or extended lengths for different applications. For instance, a third, fourth, . . . , $n^{th}$ sparging section, with dependent or independent biased modulator bodies could be provided. Although the drawings show what can be understood as a two stage injector heater assembly, it should be appreciated that there is no inherent limit as to the number of stages that could be employed to satisfy various desired heating and flow conditions. As alluded to above, it is appreciated that each of the discrete modulator bodies associated with each discrete heat demand stage may be independently controlled, or could be part of one or more spring chain(s).

It is still further appreciated that other methodologies could be employed to manipulate and/or maintain the position of the discrete slideable modulator body during first stage operation of the discrete direct injector assembly. That is, whereas the pressure associated with the working fluid flow of heater assembly 10 opposes translation of the modulator during the first stage of operation thereof, it is appreciated that the discrete stages of operation of respective heater assemblies could be controlled by exposure to fluid and/or gaseous flows associated with the side of the modulator opposite the heating fluid flow, or the region of injector assembly 12 that is downstream of the modulator and is open to the working fluid region, insuring the pressure in that region is equal to the heating fluid flow pressure and/or be closed or exposed to other flow signals, whether fluid or gaseous and/or exposed to and/or isolated from the flow signals so as to manipulate the response performance of the modulator due to the heating fluid flow pressure.

It is further appreciated that injector assemblies such as that disclosed above having multiple stages of heating operation and one or more discretely moveable modulating components 16 and/or biasing devices can be provided in configurations of than that shown in the drawings. For instance, it is appreciated that, depending upon the intended application, it may be desirable to omit the body associated with defining chamber 14. Such instances may include the utilization of injector 12 to effectuate heating of tanked materials or the like. For such applications, injector 12 may be simply suspended in a tank of working fluid and would be operable to effectuate the desired multiple staged heating of fluids contained therein. Such configurations do not envision the omission of the one or more modulating components 16 or the one or more biasing devices associated therewith such that, even when employed for tank heating activities, injector assembly 12 maintains the internal components thereof and the availability of the multiple ports, orifices, or holes associated therewith in a multiple stage manner. Accordingly, utilization of injector 12 for tank heating operations achieves the same benefits of the present invention attenuate to steam heater 12 as described above.

Therefore, one embodiment of the present invention comprises a direct injection steam heater assembly having a fluid chamber that includes one or more fluid ports to receive fluid into the fluid chamber. An injector extends into the fluid chamber and includes an enclosure extending from an upstream end to a downstream end thereof. The upstream end has a port that is configured to receive steam into the injector. A seat is disposed at the second end of the enclosure and a modulating component is disposed within the enclosure adjacent the seat. A biasing element is disposed adjacent the seat and the modulating component and configured to interact with the seat and the modulating component. A first heat section includes a first plurality of openings formed in the enclosure and a second heat section includes a second plurality of openings formed in the enclosure. The modulating component is configured to block the second plurality of openings when a pressure of the steam in the injector is lower than a fluid flow pressure and to expose the second plurality of openings when a pressure of the steam in the injector is higher than the fluid flow pressure and a demand for heat exists.

Another embodiment of the invention that is usable or combinable with one or more features, aspects, or objects of the above embodiments discloses a method of manipulating a thermal exchange of a direct injection heating device that includes providing a fluid chamber and disposing a perforated injector within the fluid chamber. A slideable modulator body is disposed within the perforated injector such that a first set of openings defined by the perforated injector allow fluid communication between a volume of the perforated injector and a volume between the fluid chamber and the perforated injector when a working fluid flow pressure is no greater than a pressure of the heating fluid flow associated with the perforated injector and such that a second set of openings which includes the first set of openings allows fluid communication between the volume of the perforated injector and the volume between the fluid chamber and the perforated injector when the pressure of the heating fluid flow is greater than the pressure of the working fluid flow.

A further embodiment of the invention that is usable or combinable with one or more of the features, objects, and aspects of the above embodiments discloses a direct injection steam heater injector assembly having an injector body that is defined by a cylinder having a longitudinal length and a plurality of holes formed through the injector body along the longitudinal length. A steam inlet is defined by the injector body and is constructed to connect the injector body to a steam source. A modulator body is disposed in the injector body and configured to be slideable relative thereto along a portion of the longitudinal length of the injector body. A seat is secured to the injector body at a location that is offset longitudinally from the intake opening and a biasing device is disposed between the seat and the modulator body that is operable to resist translation of the modulator body relative to the injector body.

It should be understood that the above description, while indicating representative preferred embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A direct injection steam heater assembly comprising:
   a fluid chamber, the fluid chamber including one or more fluid ports to receive fluid into the fluid chamber;
   an injector extending into the fluid chamber, the injector including:
      an enclosure defined by an elongate body defined by a single wall and having an interior surface and an exterior surface and extending from an upstream end to a downstream end, the upstream end having a port configured to receive steam into the injector and such that fluid in the fluid chamber flows along the exterior surface of the elongate body of the enclosure;
      a seat disposed at the downstream end of the enclosure;
      a modulating component disposed within the enclosure adjacent the seat, slidably associated with the interior surface of the elongate body, and that fluidly separates the upstream end of the enclosure from the downstream end of the enclosure;
      a biasing element disposed adjacent the seat and the modulating component and configured to interact with the seat and the modulating component;
      a first heat section including a first plurality of openings formed through the single wall of the elongate body of the enclosure;
      a second heat section including a second plurality of openings formed through the single wall of the elongate body of the enclosure;
   wherein the modulating component is configured to block the second plurality of openings when a pressure of the steam in the injector is lower than a fluid flow pressure and expose the second plurality of openings when a pressure of the steam in the injector is higher than the fluid flow pressure and a demand for heat exists such that steam is mixed with and dispersed into the fluid in the fluid chamber upon passing only through the single wall and exiting the enclosure of the injector via those of the first plurality of openings and the second plurality of openings in only the single wall that are unblocked by the modulating component prior to exiting the fluid chamber.

2. The direct injection steam heater assembly of claim 1 wherein the seat includes a cavity formed therethrough and configured to allow fluid within the fluid chamber to interact with a downstream end of the modulating component.

3. The direct injection steam heater assembly of claim 2 wherein the downstream end of the modulating component includes a recess formed therein.

4. The direct injection steam heater assembly of claim 1 wherein the first plurality of openings are fewer than the second plurality of openings.

5. The direct injection steam heater assembly of claim 1 wherein the second heat section is downstream of the first heat section.

6. The direct injection steam heater assembly of claim 1 wherein the modulating component includes a notch formed in an outer surface thereof adjacent a downstream end thereof;
   wherein the biasing element is disposed within the notch and configured to bias the modulating component away from the seat.

7. The direct injection steam heater assembly of claim 1 wherein the upstream end of the injector is exterior to the fluid chamber.

8. A direct injection injector assembly comprising:
   an injector body having an interior surface and an exterior surface that are separated from one another by a single wall and having an inlet that is configured to be fluidly connected to a first fluid path and a passage constructed to be fluidly connected to a second fluid path;
   a plurality of ports formed through the single wall of the injector body between the interior surface and the exterior surface and offset from the passage and disposed between the first fluid path and the second fluid path;
   a modulating component disposed within the injector body that fluidly separates the first fluid path from the passage and is slideable relative thereto along the interior surface such that a relative position of the modulating component relative to the injector body defines a variable number of the plurality of ports that are available for direct fluid exchange between the first fluid path and the second fluid path and wherein fluid associated with the first fluid path mixes with fluid associated with second fluid path along the exterior surface of the single wall of the injector body upon exit from the respective variable number of plurality of ports that are available for direct fluid exchange and solely responsible for dispersion of a fluid associated with the first fluid path into another fluid associated with the second fluid path; and wherein the relative position of the modulating component relative to the injector body during a first stage of operation is based on pressure of flows associated with the first fluid path and the second fluid path and during a second stage of operation is manipulated by a biasing device such that pressure of the flows of the first fluid path and the second fluid path are dissimilar.

9. The direct injection injector assembly of claim 8 wherein the biasing device is at least one of interchangeable, replaceable, and comprised of multiple stages to manipulate when transition between the first stage of operation and the second stage of operation occurs.

10. The direct injection injector assembly of claim 8 further comprising another modulating component that is independently moveable relative to the modulating component and associated with a third stage of operation.

11. The direct injection injector assembly of claim 10 further comprising another biasing device associated with defining the third stage of operation.

12. A direct injection steam heater injector assembly comprising:
an injector body defined by a cylinder having a longitudinal length of a singular wall and a plurality of holes formed through the injector body between an interior surface and an exterior surface of the singular wall and along a portion of the longitudinal length;
a fluid cylinder disposed about the injector body that defines a fluid inlet and a fluid outlet and such that fluid passing through the fluid cylinder between the fluid inlet and the fluid outlet mixes with fluid exiting the injector body along the exterior surface of the singular wall thereof and such that only the plurality of holes formed through the singular wall of the injector body disperse fluid exiting the singular wall of the injector body into fluid passing through the fluid cylinder before exit of mixed fluid at the fluid outlet of the fluid cylinder;
a steam inlet defined by the injector body and constructed to connect the injector body to a steam source;
a modulator body disposed in the injector body and configured to be slideable relative thereto along the interior surface of the singular wall along the portion of the longitudinal length of the injector body;
a seat secured to the injector body at a location that is offset longitudinally from the steam inlet and fluidly isolated from the steam inlet by the modulator body; and
a biasing device disposed between the seat and the modulator body that is operable to resist translation of the modulator body relative to the injector body.

13. The direct injection steam heater injector assembly of claim 12 further comprising an opening formed through the seat and exposed to fluid flow surrounding the injector body.

14. The direct injection steam heater injector assembly of claim 12 further comprising another biasing device disposed between the biasing device and the modulator body to provide multiple stages of translation of the modulator body relative to the injector body.

15. The direct injection steam heater injector assembly of claim 12 wherein the plurality of holes formed through the singular wall of the injector body along the longitudinal length includes a first set of holes formed through the singular wall of the injector body along a first portion of the longitudinal length of the singular wall of the injector body and a second set of hole formed through the singular wall of the injector body along a second portion of the longitudinal length of the singular wall of the injector body and the first set of holes includes fewer holes than the second set of holes.

16. The direct injection steam heater injector assembly of claim 12 further comprising a notch formed in the modulator body that is constructed to cooperate with the biasing device.

* * * * *